United States Patent
Mizushima et al.

(10) Patent No.: US 8,553,358 B2
(45) Date of Patent: Oct. 8, 2013

(54) MAGNETIC HEAD

(75) Inventors: Koichi Mizushima, Kamakura (JP); Rie Sato, Yokohama (JP); Hirofumi Suto, Fuchu (JP); Tao Yang, Yokohama (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 13/428,353

(22) Filed: Mar. 23, 2012

(65) Prior Publication Data

US 2012/0250180 A1  Oct. 4, 2012

(30) Foreign Application Priority Data

Mar. 30, 2011  (JP) ................................. 2011-076284

(51) Int. Cl.
G11B 21/02 (2006.01)

(52) U.S. Cl.
USPC ........................................................ 360/110

(58) Field of Classification Search
USPC ................. 360/234.3, 125.04, 235.4, 123.37
See application file for complete search history.

(56) References Cited

U.S. PATENT DOCUMENTS

| | | | | |
|---|---|---|---|---|
| 5,050,012 A * | 9/1991 | Nishiumi et al. | ............... | 360/66 |
| 7,085,083 B2 * | 8/2006 | Zhu et al. | ........................ | 360/31 |
| 7,099,121 B2 * | 8/2006 | Parker et al. | .................. | 360/317 |
| 7,362,530 B2 * | 4/2008 | Hashizume | .................... | 360/67 |
| 7,372,665 B1 * | 5/2008 | Stoev et al. | ............. | 360/125.33 |
| 7,667,933 B2 * | 2/2010 | Kudo et al. | .................... | 360/313 |
| 7,808,746 B2 * | 10/2010 | Burbank et al. | ........... | 360/294.3 |
| 7,813,087 B2 * | 10/2010 | Sato et al. | .................. | 360/324.1 |
| 8,107,180 B2 * | 1/2012 | Nishida et al. | .................. | 360/51 |
| 8,208,221 B2 * | 6/2012 | Burbank et al. | ......... | 360/125.74 |
| 8,289,821 B1 * | 10/2012 | Huber | ........................ | 369/30.03 |
| 2011/0030109 A1 * | 2/2011 | Saito | ................................. | 850/5 |
| 2012/0051196 A1 * | 3/2012 | Grobis et al. | ............. | 369/13.24 |
| 2012/0075752 A1 * | 3/2012 | Sato et al. | ..................... | 360/324 |
| 2012/0224283 A1 | 9/2012 | Sato et al. | | |
| 2012/0314325 A1 * | 12/2012 | Wessel et al. | ............ | 360/125.01 |
| 2012/0327529 A1 * | 12/2012 | Hutchinson et al. | ............ | 360/31 |
| 2013/0027803 A1 * | 1/2013 | Tanabe et al. | .................. | 360/55 |

FOREIGN PATENT DOCUMENTS

| | | |
|---|---|---|
| JP | H-07326002 A | 12/1995 |
| JP | 2005-285242 A | 10/2005 |
| JP | 2006-019703 A | 1/2006 |
| JP | 2010-055725 A | 3/2010 |
| JP | 2010-192063 A | 9/2010 |

OTHER PUBLICATIONS

U.S. Appl. No. 13/416,815, filed Mar. 9, 2012, Sato.
Japanese First Office Action (with English translation) dated Mar. 26, 2013 from JP Application No. 2011-076284, 6 pages.

* cited by examiner

*Primary Examiner* — Allen T Cao
(74) *Attorney, Agent, or Firm* — Ohlandt, Greeley, Ruggiero & Perle, L.L.P.

(57) ABSTRACT

According to one embodiment, a magnetic head for reading data from a magnetic recording medium by utilizing a magnetic resonance phenomenon includes an auxiliary magnetic pole, a first oscillator, and a second oscillator. The auxiliary magnetic pole is to apply a magnetic field to the magnetic recording medium. The first oscillator is to oscillate at a first frequency and apply, to the magnetic recording medium, a first high-frequency magnetic field corresponding to the first frequency. The second oscillator to oscillate at a second frequency different from the first frequency and apply, to the magnetic recording medium, a second high-frequency magnetic field corresponding to the second frequency.

5 Claims, 6 Drawing Sheets

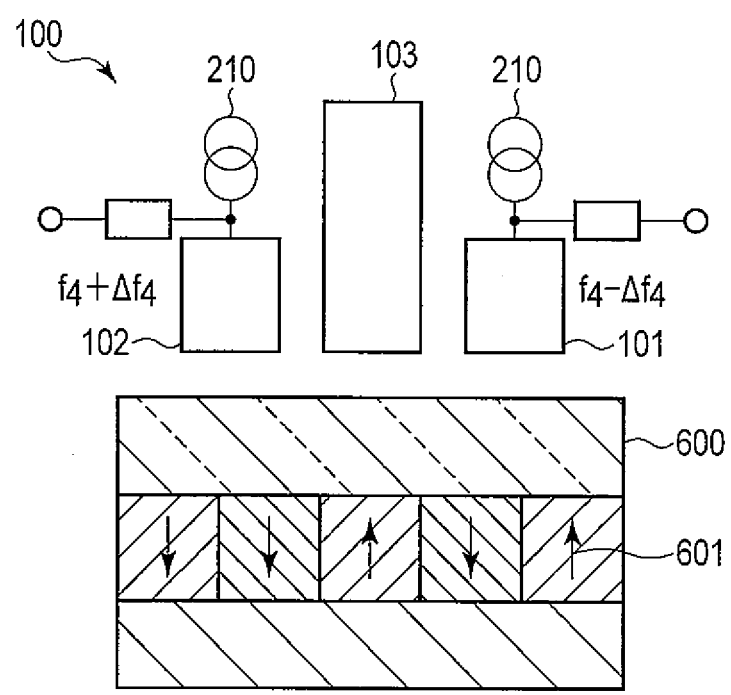
F I G. 6

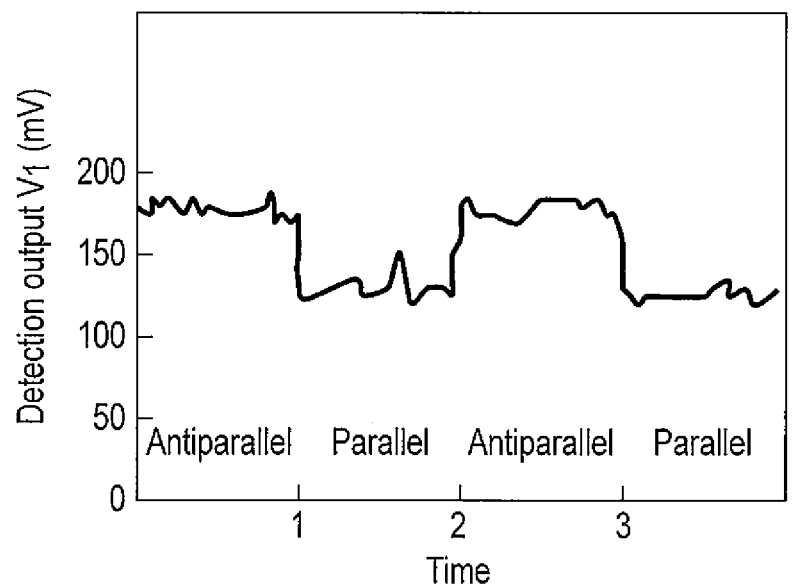
F I G. 10
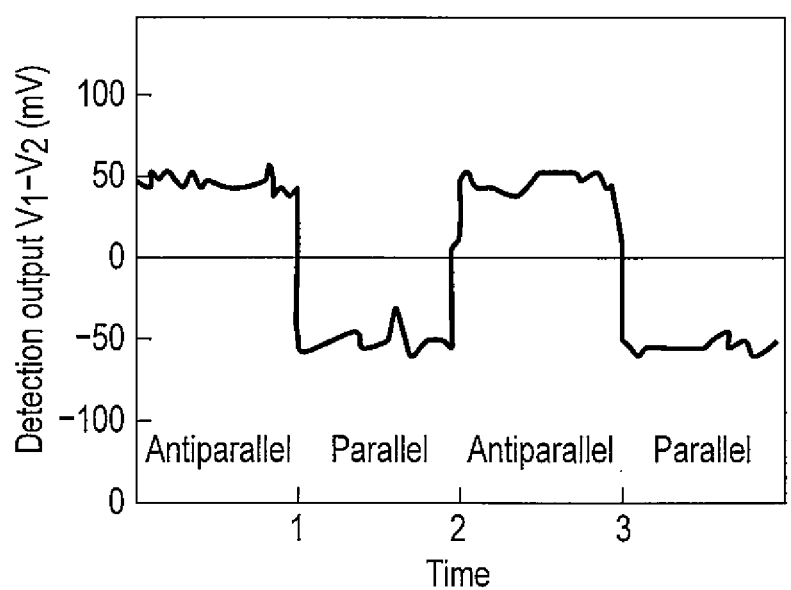
F I G. 11

MAGNETIC HEAD

CROSS-REFERENCE TO RELATED APPLICATIONS

This application is based upon and claims the benefit of priority form prior Japanese Patent Application No. 2011-076284, filed Mar. 30, 2011, the entire contents of which are incorporated herein by reference.

FIELD

Embodiments described herein relate generally to a read head using spin-torque oscillators as magnetic sensors.

BACKGROUND

In recent years, the recording density achieved by magnetic recording has increased by 40% per year, due to developments in perpendicular magnetization media and adoption of a read head (TMR head) using a tunneling magneto-resistive (TMR) element as a magnetic sensor. As of 2009, a recording density of 500 Gb/in$^2$ was achieved. In addition, as a measure for rapidly improving the recording density, patterned media are known.

Further, in recent years, a three-dimensional recording method utilizing a multilayered magnetic recording medium has been proposed as another measure for rapidly improving the recording density. In the three-dimensional recording method, a magnetic recording medium including a plurality of recording layers with different magnetic resonance frequencies is used, and selective writing data to the layers and selective reading data from them are performed by using a spin-torque oscillator and an auxiliary magnetic pole together.

In a conventional three-dimensional recording method in which reading of recorded data is performed by using one auxiliary magnetic pole and one spin-torque oscillator, a reading voltage is small and a polarity thereof does not depend on the direction of magnetization of a recording bit, and thus the bit error rate may increase.

BRIEF DESCRIPTION OF THE DRAWINGS

FIG. 6 is a schematic diagram illustrating an example where a magnetic recording medium illustrated in FIG. 1 is a perpendicular magnetization medium.

FIG. 10 is a graph which illustrates a voltage signal that is obtained by detecting a high-frequency voltage output from one of the spin-torque oscillators illustrated in FIG. 9, as a comparative example.

FIG. 11 is a graph which schematically illustrates a voltage signal output from a magnetic head that includes the spin-torque oscillators illustrated in FIG. 9.

DETAILED DESCRIPTION

Figure 1:
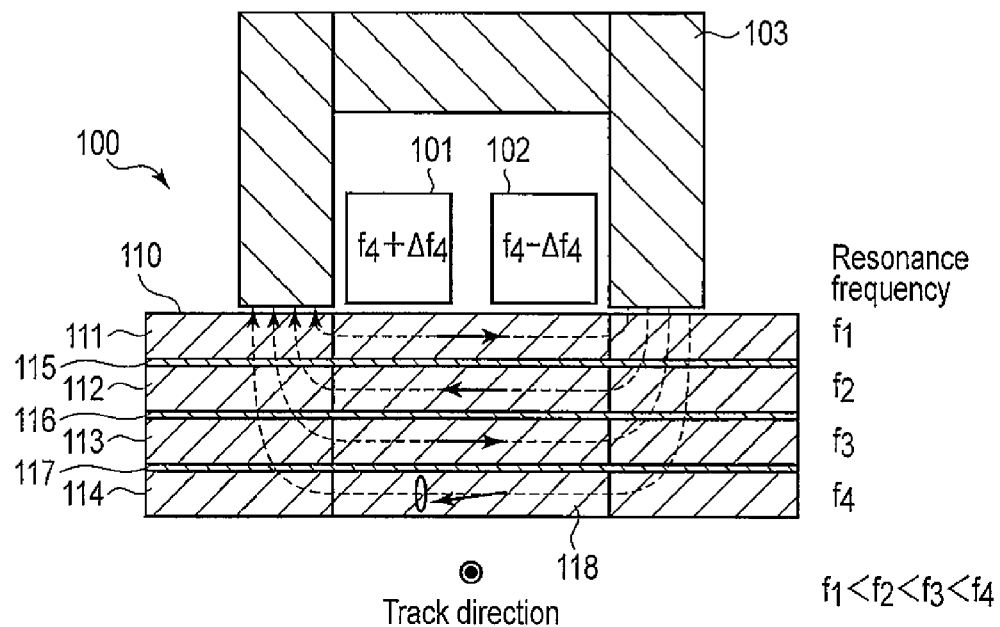
FIG. 1 is a schematic diagram illustrating a magnetic head according to an embodiment.

In general, according to one embodiment, a magnetic head for reading data from a magnetic recording medium by utilizing a magnetic resonance phenomenon includes an auxiliary magnetic pole, a first oscillator, and a second oscillator. The auxiliary magnetic pole is to apply a magnetic field to the magnetic recording medium. The first oscillator is oscillate at a first frequency and apply, to the magnetic recording medium, a first high-frequency magnetic field corresponding to the first frequency. The second oscillator to oscillate at a second frequency different from the first frequency and apply, to the magnetic recording medium, a second high-frequency magnetic field corresponding to the second frequency.

A magnetic head according to an embodiment will be explained hereinafter with reference to the accompanying drawings. In the following embodiment, elements denoted by the same reference numeral perform the same operation, and overlapping explanation thereof is omitted.

FIG. 1 schematically illustrates a magnetic head 100 according to an embodiment. The magnetic head 100 is used as a read head which reads data from a magnetic recording medium 110.

The present embodiment shows an example where the magnetic recording medium 110 is a three-dimensional magnetic recording medium which includes a plurality of recording layers (or magnetic layers), for example, four recording layers 111, 112, 113, and 114. The magnetic recording medium 110 is formed in, for example, a disk shape. The magnetic recording medium 110 can be rotated, and thereby relatively moved with respect to the magnetic head 100. A plurality of circular tracks are formed at regular intervals for each recording layer, along a radial direction from the center of the magnetic recording medium 110. In each track, recording bits (or magnetic substance bits) are arranged at regular intervals. FIG. 1 illustrates part of a cross section of the magnetic recording medium 110 in a plane perpendicular to a track direction. In the embodiment, the track direction corresponds to a circumferential direction of the magnetic recording medium 110 which is perpendicular to the radial direction.

The recording layers 111, 112, 113, and 114 have respective magnetic resonance frequencies which are different from each other. The magnetic resonance frequencies increase from the recording layer 111, which is closest to the magnetic head 100, toward the recording layer 114 which is most distant from the magnetic head 100. Specifically, supposing that the magnetic resonance frequencies of the recording layers 111, 112, 113, and 114 are $f_1$, $f_2$, $f_3$, and $f_4$, respectively, the condition "$f_1<f_2<f_3<f_4$" is satisfied.

In the magnetic recording medium 110, the recording layers 111, 112, 113, and 114 are isolated from each other by non-magnetic layers 115, 116, and 117. Specifically, the non-magnetic layer 115 is interposed between the recording layer 111 and the recording layer 112, the non-magnetic layer 116 is interposed between the recording layer 112 and the recording layer 113, and the non-magnetic layer 117 is interposed between the recording layer 113 and the recording layer 114.

Each of the recording layers 111, 112, 113 and 114 is formed of an in-plane magnetization film. The magnetization of each of recording bits included in the recording layers 111, 112, 113 and 114 is disposed in a direction which is perpendicular to the track direction and parallel to the film surface of each recording layer, that is, in a radial direction of the magnetic recording medium 110. The direction of the magnetization of a recording bit corresponds to data recorded on the recording bit. For example, the magnetization of a recording bit on which data "0" is recorded is disposed in a direction going toward the center of the magnetic recording medium 110, and the magnetization of a recording bit on which data "1" is recorded is disposed in a direction going outward from the center of the magnetic recording medium 110.

In the magnetic recording medium 110 having the above structure, a magnetic flux from a recording bit is contained in each recording layer, and thus there is a slight leakage of a magnetic field from the magnetic recording medium 110. Therefore, in a magnetic recording/reproducing method in which reading is performed by detecting a magnetic field from recording bits, data cannot be read from the magnetic recording medium 110. In contrast, in the magnetic recording/reproducing method of the present embodiment utilizing a magnetic resonance phenomenon, data can be read from the magnetic recording medium 110. In addition, since the magnetostatic coupling between recording bits is weak, an increase in density of the magnetic recording medium 110 is possible. Further, since there is a slight leakage of a magnetic field from each of the recording layers, it is possible to adopt three-dimensional recording of recording data in the recording layers.

The magnetic head 100 in FIG. 1 includes spin-torque oscillators 101 and 102 which serve as magnetic sensors, and an auxiliary magnetic pole 103 which applies a magnetic field to the magnetic recording medium 110. The spin-torque oscillators 101 and 102 have respective oscillating frequencies which are different from each other.

As an example, the auxiliary magnetic pole 103 is a ring-shaped magnetic pole, and applies, to the magnetic recording medium 110, a magnetic field in a direction going outward from the center of the magnetic recording medium 110. Recording bits of each recording layer, which are located just under the auxiliary magnetic pole 103, are supplied with a magnetic field that is stronger than that applied to other recording bits of the recording layer. When a magnetic field is applied to a recording bit, a magnetic resonance frequency of the recording bit changes according to the strength of the magnetic field, and relation between the direction of the magnetic field and the direction of magnetization of the recording bit. To specifically describe the recording bit of the recording layer 114, when magnetization of the recording bit is parallel with the magnetic field applied by the auxiliary magnetic pole 103, the magnetic resonance frequency $f_4$ of the recording bit changes to a value which is determined by the expression "$f_4^* = f_4 + \Delta f_4$". Here, magnetization of the recording bit being parallel with the magnetic field means that the magnetization of the recording bit is in the same direction as the magnetic field. On the other hand, when magnetization of the recording bit is antiparallel with the magnetic field applied by the auxiliary magnetic pole 103, the magnetic resonance frequency $f_4$ of the recording bit changes to a value which is determined by the expression "$f_4^* = f_4 - \Delta f_4$". Here, magnetization of the recording bit being antiparallel with the magnetic field means that the magnetization of the recording bit is in the opposite direction of the magnetic field. If a magnetic field applied to a recording bit of the recording layer 114, which is located just under the auxiliary magnetic pole 103, is set to $H_4$, and the gyromagnetic ratio is $\gamma$, $\Delta f_4$ is indicated by the following numerical expression (1):

$$\Delta f_4 = \frac{\gamma}{2\pi} \times H_4. \quad (1)$$

As described above, the magnetic resonance frequency of the recording bit of each recording layer, which is located just under the auxiliary magnetic pole 103, is different from the magnetic resonance frequency of other recording bits in the same recording layer.

Figure 2:
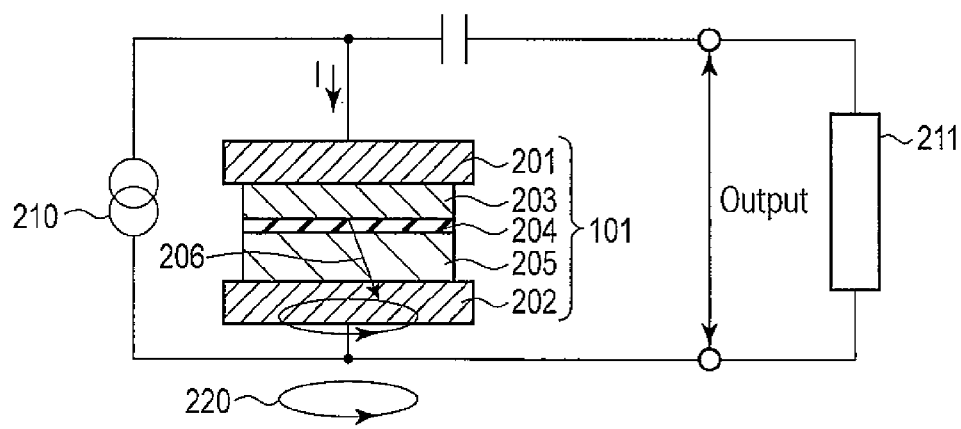
FIG. 2 is a schematic diagram illustrating each spin-torque oscillator illustrated in FIG. 1.

As illustrated in FIG. 2, the spin-torque oscillator 101 is an element of a nanometer size, which has a multilayer structure in which a magnetization fixed layer 203, a non-magnetic layer 204, and a magnetization free layer 205 are stacked in this order. Since the spin-torque oscillator 102 has the same structure as that of the spin-torque oscillator 101 illustrated in FIG. 2, explanation of the structure of the spin-torque oscillator 102 is omitted.

The magnetization fixed layer 203 has perpendicular magnetization. Specifically, the direction of magnetization of the magnetization fixed layer 203 is substantially perpendicular to a film surface thereof. The magnetization of the magnetization fixed layer 203 is fixed.

The magnetization fixed layer 203 is formed of a material such as cobalt (Co), nickel (Ni), iron (Fe), alloy including at least one of Co, Ni, and Fe, and the like. The magnetization fixed layer 203 may be formed of a multilayer film including a ferromagnetic layer. For example, the magnetization fixed layer 203 can be formed of exchange coupled films which are formed by stacking a ferromagnetic layer and an antiferromagnetic layer. In the example, the antiferromagnetic layer is exchange-coupled with the ferromagnetic layer, and thereby fixes the direction of magnetization of the ferromagnetic layer, that is, the direction of magnetization of the magnetization fixed layer 203.

The non-magnetic layer 204 is interposed between the magnetization fixed layer 203 and the magnetization free layer 205. The non-magnetic layer 204 is formed of a non-magnetic metal such as copper (Cu), or an insulating film such as Mg—O (magnesium oxide film) and Al—O (aluminum oxide film). If the magnetic head 100 is used as a read head, the non-magnetic layer 204 is preferably formed of an insulating film such as Mg—O and Al—O, to obtain a large output voltage. That is, it is preferable that the magnetic head 100 is a tunneling magneto-resistive (TMR) type oscillator.

The magnetization free layer 205 has perpendicular magnetization. Specifically, the direction of magnetization 206 of the magnetization free layer 205 is substantially perpendicular to a film surface thereof. In addition, the magnetization free layer 205 has uniaxial magnetic anisotropy. Uniaxial magnetic anisotropy can be generated by forming a film of a material having high magneto-crystalline anisotropy in a uniform magnetic field, or annealing the formed film in a uniform magnetic field.

The spin-torque oscillator 101 also includes a pair of electrodes 201 and 202 configured to let a current flow perpendicularly to the film surface. In the spin-torque oscillator 101, when a direct current I is supplied from a current source 210, the current I flows perpendicularly to the film surface. Specifically, the electric current flows from the magnetization fixed layer 203 to the magnetization free layer 205 through the non-magnetic layer 204. When the current I is supplied, precession movement of the magnetization 206 of the magnetization free layer 205 is induced, that is, the magnetization 206 oscillates at a particular frequency. The current I indicates a current which has a current density not less than a threshold current density.

If the angular frequency at which the magnetization 206 of the magnetization free layer 205 oscillates is denoted by $\omega$, the oscillating frequency of the spin-torque oscillator 101 is $\omega/2\pi$. The oscillating frequency of the spin-torque oscillator 101 depends on the size and the thickness of the magnetization free layer 205, the direct current I to cause the magnetization 206 to oscillate, and the strength of an external magnetic field which acts on the magnetization 206. By properly controlling them, the oscillating frequency of the spin-torque oscillator 101 can be set to a desired value of a range from several gigahertz to several tens of gigahertz.

By the magneto-resistive effect (giant magneto-resistive (GMR) effect or tunneling magneto-resistive (TMR) effect) between the magnetization 206 of the magnetization free layer 205, which oscillates, and the magnetization of the magnetization fixed layer 203, a high-frequency voltage from several gigahertz to several tens of gigahertz is generated between the electrodes 201 and 202. The high-frequency voltage is output to a load 211. In addition, in the vicinity of the spin-torque oscillator 101, a high-frequency magnetic field (high-frequency rotational magnetic field) 220, which has a frequency (several gigahertz to several tens of gigahertz) that corresponds to the oscillating frequency of the spin-torque oscillator 101, is generated due to precession movement of the magnetization 206 of the magnetization free layer 205.

The magnetic head 100 reads data recorded on the magnetic recording medium 110, by using both the high-frequency voltage (power) and the high-frequency magnetic field which are generated from each of the spin-torque oscillators 101 and 102.

The high-frequency magnetic field 220, which is generated due to precession movement of the magnetization in the magnetization free layer 205 of the spin-torque oscillator 101, acts on each of recording bits which are located in the vicinity of the spin-torque oscillator 101. When the oscillating frequency of the spin-torque oscillator 101 coincides with the magnetic resonance frequency of the recording bit, magnetic resonance occurs in the recording bit. In magnetic resonance, the recording bit absorbs energy of the high-frequency magnetic field 220. On the other hand, the spin-torque oscillator 101 loses the energy due to the resonance absorption in the recording bit. As a result, when magnetic resonance occurs under passage of the fixed current, the amplitude of the output voltage (referred to as "reading voltage") of the spin-torque oscillator 101 is reduced. As described later, the magnetic head 100 can read out data from the magnetic recording medium 110, by detecting a change in amplitude of the output voltage of each of the spin-torque oscillators 101 and 102, which is caused by the magnetic resonance. Since the phase of the voltage also changes together with the change in the output voltage, it is also possible to read out data recorded on the magnetic recording medium 110 by detecting a change in phase instead of change in amplitude.

In the magnetic head 100 including the auxiliary magnetic pole 103, there are cases where the spin-torque oscillators 101 and 102 cannot be arranged just above a recording bit to be read out. However, since the high-frequency magnetic permeability of a magnetic substance which is in a resonant state is at least ten times as large as that of the magnetic substance in a non-resonant state, the magnetic flux of the high-frequency magnetic field concentrates on the recording bit to be read out and whereby a sufficiently strong high-frequency magnetic field is applied to the recording bit, even when the spin-torque oscillators 101 and 102 are not arranged just above the recording bit to be read out.

Next, a method of reading data from the magnetic recording medium 110 will be specifically explained hereinafter. In the following explanation, suppose that data which is recorded on a recording bit 118 of the fourth recording layer 114 is read out. As described above, the auxiliary magnetic pole 103 applies a magnetic field, which is stronger than a magnetic field applied to other recording bits of the recording layer 119, to the recording bit 118 that is located just under the auxiliary magnetic pole 103. Thereby, the magnetic resonance frequency of the recording bit 118 is changed according to the direction of magnetization thereof. Specifically, when magnetization of the recording bit 118 is parallel with a magnetic field applied by the auxiliary magnetic pole 103, the magnetic resonance frequency of the recording bit 118 is changed to "$f_4 + \Delta f_4$". When magnetization of the recording bit 118 is antiparallel with the magnetic field of the auxiliary magnetic pole 103, the magnetic resonance frequency of the recording bit 118 is changed to "$f_4 - \Delta f_4$".

When data is read from the fourth recording layer 114, the oscillating frequency of the spin-torque oscillator 101 is set to "$f_4 + \Delta f_4$", and the oscillating frequency of the spin-torque oscillator 102 is set to "$f_4 - \Delta f_4$". The difference between the oscillating frequency of the spin-torque oscillator 101 and the oscillating frequency of the spin-torque oscillator 102 is $2\Delta f_4$. Thereby, the spin-torque oscillator 101 can selectively generate magnetic resonance for the recording bit 118 which has magnetization in the direction parallel with the direction of the magnetic field from the auxiliary magnetic pole 103, and the spin-torque oscillator 102 can selectively generate magnetic resonance for the recording bit 118 which has magnetization in the direction antiparallel with the direction of the magnetic field from the auxiliary magnetic pole 103.

When the magnetic recording medium 110 is relatively moved with respect to the magnetic head 100, the amplitudes of the output voltages of the spin-torque oscillators 101 and 102 change. Specifically, when the magnetization of the recording bit 118 which passes just under the magnetic head 100 is parallel with the magnetic field from the auxiliary magnetic pole 103, the energy loss of the spin-torque oscillator 101 increases by resonance absorption, and the amplitude of the output voltage of the spin-torque oscillator 101 is reduced. On the contrary, when the magnetization of the recording bit 118 which passes just under the magnetic head 100 is antiparallel with the magnetic field from the auxiliary magnetic pole 103, energy loss of the spin-torque oscillator 102 increases by resonance absorption, and the amplitude of the output voltage of the spin-torque oscillator 102 is reduced.

Figure 3:
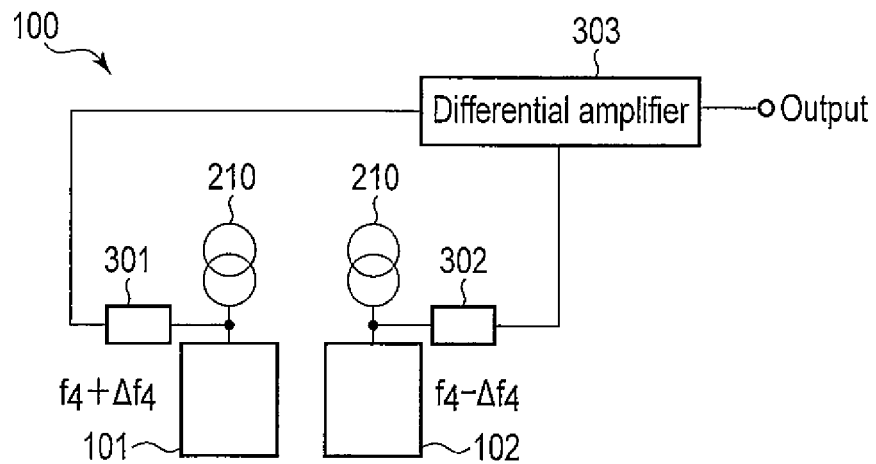
FIG. 3 is a schematic diagram illustrating a circuit which processes high-frequency voltages output by the spin-torque oscillators illustrated in FIG. 1.

As illustrated in FIG. 3, the high-frequency voltage output from the spin-torque oscillator 101 is provided to an amplitude modulation (AM) detection circuit 301. The AM detection circuit 301 performs AM detection for the high-frequency voltage from the spin-torque oscillator 101, and outputs an amplitude value of the high-frequency voltage. In the same manner, the high-frequency voltage output from the spin-torque oscillator 102 is subjected to AM detection by an AM detection circuit 302. A differential amplifier 303 is used as a subtraction circuit. The differential amplifier 303 calculates a difference between a detection output $V_1$ of the AM detection circuit 301 and a detection output $V_2$ of the AM detection circuit 302 to generate a voltage signal (reading voltage).

Figure 4:
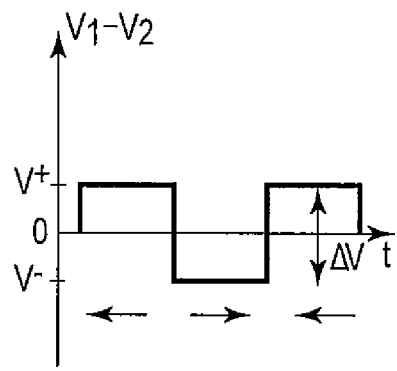
FIG. 4 is a graph schematically illustrating a voltage signal output by a differential amplifier illustrated in FIG. 3.

FIG. 4 illustrates an example of a voltage signal output from the differential amplifier 303. In FIG. 4, the vertical axis indicates the signal level of the voltage signal, and the transverse axis indicates the time. Arrows shown in FIG. 4 indicate the direction of magnetization of the recording bits 118. As illustrated in FIG. 4, the polarity of the voltage signal changes, depending on the direction of magnetization of the recording bit 118, that is, data ("0" or "1") recorded on the recording bit 118. Therefore, data recorded on the recording bit 118 can be read out by determining the polarity of the voltage signal.

Figure 5:
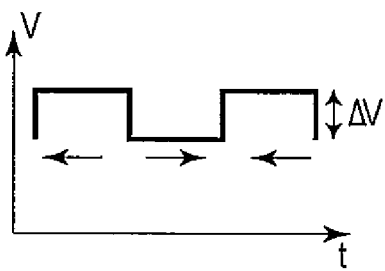
FIG. 5 is a graph schematically illustrating a voltage signal which is obtained by detecting a high-frequency voltage output from one of the spin-torque oscillators illustrated in FIG. 1.

The magnetic head 100 also can read out data from the magnetic recording medium 110, by using only one of the spin-torque oscillators 101 and 102. FIG. 5 illustrates a voltage signal after the output voltage from the spin-torque oscillator 101 is detected. As illustrated in FIG. 5, when one spin-torque oscillator is used, the polarity of the voltage signal does not depend on the direction of magnetization of the recording bit. Therefore, data recorded on the recording bit is read out by determining the signal level of the voltage signal.

The method of the present embodiment, in which the polarity of the voltage signal is determined, can be performed more easily than the reading method in which the signal level of the voltage signal is determined. In addition, when the two spin-torque oscillators 101 and 102 are used, the change quantity ΔV of the voltage signal is larger, and the influence of noise or the like on the voltage signal can be reduced. Therefore, the magnetic head 100 of the present embodiment using the two spin-torque oscillators 101 and 102 can more accurately read out data recorded on the magnetic recording medium 110, and reduce the bit error rate.

When data recorded on another recording layer is read out, the oscillating frequencies of the spin-torque oscillators 101 and 102 are set according to the magnetic resonance frequency of the recording layer to be read out. As another example, the magnetic head 100 may be provided with a plurality of pairs of spin-torque oscillators, which correspond to respective recording layers of the magnetic recording medium 110.

In addition, it is desirable that the absolute values of two voltage values $V^+$ and $V^-$, which the voltage signal output from the differential amplifier 303 can have, are almost equal to each other. That is, it is desirable to use a pair of spin-torque oscillators 101 and 102 which have almost equal output voltage levels.

The magnetic recording medium 110 is not limited to the example of a three-dimensional magnetic recording medium which includes a plurality of recording layers as illustrated in FIG. 1, but may be a magnetic recording medium having one recording layer. Further, the magnetic recording medium 110 is not limited to the example of a magnetic recording medium (in-plane magnetization medium) which has in-plane magnetization, but may be a magnetic recording medium (perpendicular magnetization medium) 600 in which recording bits have perpendicular magnetization 601 as illustrated in FIG. 6.

The magnetic head 100 illustrated in FIG. 1 can also be used as an assist type recording head which writes data on the magnetic recording medium 110. When the magnetic head 100 is used as a recording head, the magnetic head 100 uses the auxiliary magnetic pole 103 as a recording magnetic pole, and uses the spin-torque oscillators 101 and 102 as oscillators for microwave assisted magnetic recording. Reading by the magnetic head 100 and writing by the magnetic head 100 are different in that the magnetic field produced by the recording magnetic pole (auxiliary magnetic pole) 103 and the high-frequency magnetic field produced by the oscillator 101 or 102 in recording are stronger than those in reading, to invert the magnetization of recording bits.

When the magnetic head 100 is used as a recording head, the spin-torque oscillators 101 and 102 are preferably current perpendicular-to-plane (CPP) type oscillators, which can generate a strong high-frequency magnetic field (also referred to as microwave magnetic field) by passage of a large current.

Next, an example of a magnetic recording and reproducing apparatus equipped with the above magnetic head 100 will be explained hereinafter, with reference to FIG. 7 and FIG. 8.

Figure 7:
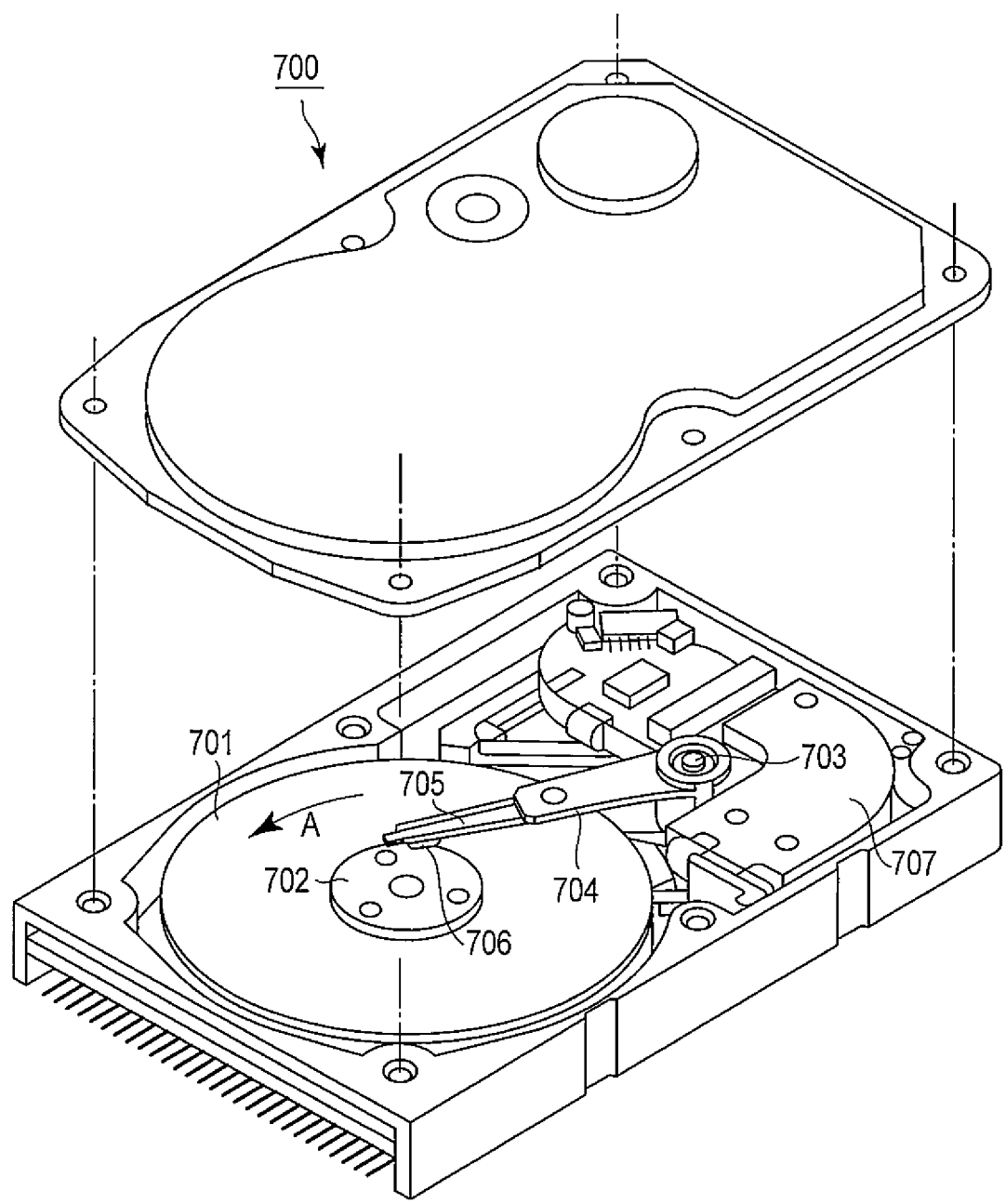
FIG. 7 is a schematic diagram illustrating a magnetic recording and reproducing apparatus according to an embodiment.

FIG. 7 schematically illustrates a magnetic recording and reproducing apparatus 700 according to one embodiment. The magnetic recording and reproducing apparatus 700 includes a magnetic disk 701 corresponding to a magnetic recording medium. The magnetic disk 701 is mounted on a spindle 702, and rotated in a direction indicated by arrow A by a spindle motor. An actuator arm 704 is held by a pivot 703 arranged near the magnetic disk 701. On a distal end of the actuator arm 704, a suspension 705 is mounted. A head slider 706 is supported by an undersurface of the suspension 705. The head slider 706 is equipped with, for example, the magnetic head 100 illustrated in FIG. 1. A voice coil motor 707 is arranged near a proximal end part of the actuator arm 704.

When the magnetic disk 701 is rotated, the actuator arm 704 is pivotally moved by the voice coil motor 707 to load the head slider 706 onto the magnetic disk 701. Then, an air bearing surface (ABS) of the head slider 706 equipped with the magnetic head is held with a predetermined floating amount from the surface of the magnetic disk 701. In this state, data recorded on the magnetic disk 701 can be read. The head slider 706 may be of a contact-traveling type which contacts the magnetic disk 701.

Figure 8:
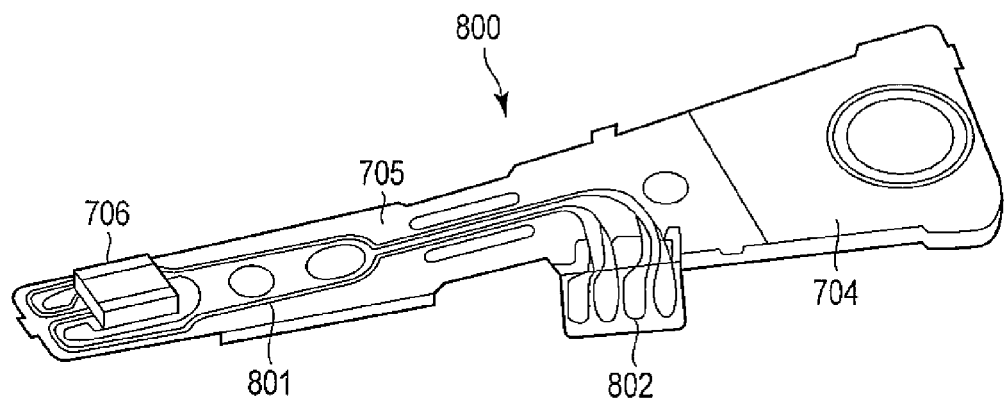
FIG. 8 is a schematic diagram illustrating a magnetic head assembly, which includes a tip part extending from and including an actuator arm illustrated in FIG. 7.

FIG. 8 is an enlarged perspective view of a magnetic head assembly 800 which includes a tip part extending from and including the actuator arm 704, as viewed from the magnetic disk side. The magnetic head assembly 800 includes the actuator arm 704, and the suspension 705 is connected to one end of the actuator arm 704. The head slider 706 which includes the magnetic head 100 illustrated in FIG. 1 is attached to a distal end part of the suspension 705. A lead line 801 for writing and reading a signal runs through the suspension 705, and the lead line 801 is electrically connected to each of electrodes of the magnetic head incorporated in the head slider 706. The lead line 801 is connected to an electrode pad 802 of the magnetic head assembly 800.

As described above, according to the magnetic head of the present embodiment, two spin-torque oscillators which have different oscillating frequencies are used as magnetic sensors, and thereby it is possible to obtain a voltage signal, the polarity of which changes according to data recorded on the recording bit of the magnetic recording medium, and which has a high signal level. As a result, the bit error rate can be reduced.

Next, specific examples of the present embodiment will be explained hereinafter. However, the present embodiment is not limited to the following examples.

EXAMPLE

Next, a magnetic head according to an example will be explained hereinafter.

Figure 9:
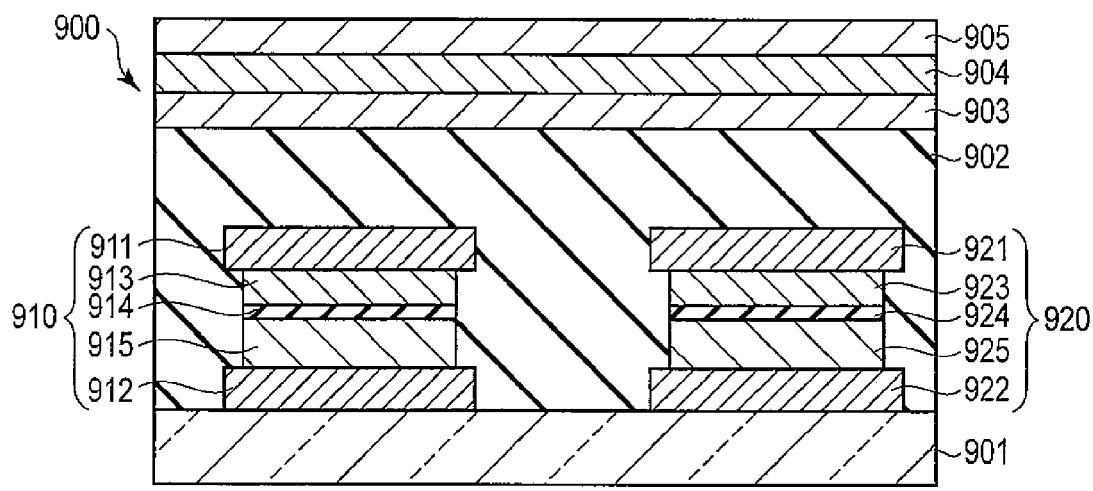
FIG. 9 is a schematic diagram illustrating the spin-torque oscillators according to an example.

FIG. 9 schematically illustrates an oscillator/resonator assembly 900 according to the example. The oscillator part of FIG. 9 was prepared by forming a magnetic layered film on a glass substrate 901 by sputtering, and processing the magnetic layered film by using electron beams and photolithography. The oscillator part is provided with two spin-torque oscillators 910 and 920 which are arranged in parallel. The spin-torque oscillators 910 and 920 are a pair of oscillators which have the same structure. The size of the spin-torque oscillators 910 and 920 is 40 nm×80 nm. Magnetization free layers 915 and 925 of the spin-torque oscillators 910 and 920 are each formed of a CoFeB film having a thickness of 2 nm. Non-magnetic layers 914 and 924 are each formed of an Mg—O tunnel insulating film having a thickness of 1 nm. Magnetization fixed layers 915 and 925 are each formed of multilayer films of CoFeB/Ru/CoFe. The CoFeB film has a thickness of 4 nm, the Ru film has a thickness of a 0.92 nm, and the CoFe film has a thickness of a 4 nm. Electrodes 911, 912, 921, and 922 are formed of Cu.

A CoFe film (magnetic film), which was formed by successively stacking an CoFe2 film 903, a Cu film 904, and a CoFe1 film 905, is formed above the spin-torque oscillators 910 and 920, with an $SiO_2$ layer serving as an insulating layer and interposed therebetween. The CoFe film serves as part of a central conductor of a coplanar guide. The coercivity Hc of the CoFe film is 520 Oe. The magnetic resonance frequency of the CoFe film under an external magnetic field of 450 Oe is 8.1 GHz when the external magnetic field was parallel with magnetization of the CoFe film, and 4.3 GHz when the external magnetic field was antiparallel with magnetization of the CoFe film.

Case 1: Using Spin-Torque Oscillator 910 Alone

The oscillating frequency of the spin-torque oscillator 910 under the state where the external magnetic field 450 Oe is applied is set to 8.1 GHz, by controlling a current flowing through the spin-torque oscillator 910. FIG. 10 illustrates a result of measurement of a detection output $V_1$ of the spin-torque oscillator 910, by changing the direction of the external magnetic field each second to be parallel or antiparallel with the magnetization of the CoFe film. FIG. 10 proves that the energy loss of the oscillator increases by resonance absorption, and the output voltage is reduced when the magnetization of the CoFe film is parallel with the external magnetic field. Specifically, an output according to the direction of magnetization is obtained, and reading of data is performed.

Case 2: Using Both the Spin-Torque Oscillators 910 and 920

The oscillation frequencies of the spin-torque oscillators 910 and 920 under the state where the external magnetic field 450 Oe is applied are set to 8.1 GHz and 4.3 GHz, respectively, by controlling a current flowing through the spin-torque oscillators 910 and 920. FIG. 11 illustrates a result of measurement of a difference $V_1$-$V_2$ between the output voltages from the spin-torque oscillators 910 and 920, by changing the direction of the external magnetic field each second to be parallel or antiparallel with the magnetization of the CoFe film. When the magnetization of the CoFe film is parallel with the external magnetic field, the energy loss of the spin-torque oscillator 910 increases by resonance absorption, and the output voltage $V_1$ of the spin-torque oscillator 910 is reduced. In comparison with this, when the magnetization of the CoFe film is antiparallel with the external magnetic field, energy loss of the spin-torque oscillator 920 increases by resonance absorption, and the output voltage $V_2$ of the spin-torque oscillator 920 is reduced. As illustrated in FIG. 11, also when the two spin-torque oscillators 910 and 920 are used, a voltage signal according to the direction of magnetization is obtained, and reading of data is performed.

When Case 1 is compared with Case 2, the difference in Case 2 between the signal level obtained when the magnetization of the CoFe film is parallel with the external magnetic field and the signal level obtained when the magnetization of the CoFe film is antiparallel with the external magnetic field is twice as large as the difference in Case 1. In addition, in Case 2, the polarity of the voltage signal changes according to the direction of magnetization of the CoFe film. Therefore, it proves that it is possible to obtain a voltage signal, the polarity of which changes according to data recorded on a recording bit of the magnetic recording medium, and which has a large change in signal level, by using two spin-torque oscillators having different oscillating frequencies as in the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic head for reading data from a magnetic recording medium by utilizing a magnetic resonance phenomenon, comprising:
    an auxiliary magnetic pole to apply a magnetic field to the magnetic recording medium;
    a first oscillator to oscillate at a first frequency and apply, to the magnetic recording medium, a first high-frequency magnetic field corresponding to the first frequency; and
    a second oscillator to oscillate at a second frequency different from the first frequency and apply, to the magnetic recording medium, a second high-frequency magnetic field corresponding to the second frequency.

2. The magnetic head according to claim 1, further comprising:
    a first detection circuit configured to detect a first high-frequency voltage output from the first oscillator to generate a first detection output;
    a second detection circuit configured to detect a second high-frequency voltage output from the second oscillator to generate a second detection output; and
    a differential amplifier to obtain a difference signal between the first detection output and the second detection output.

3. The magnetic head according to claim 2, wherein the first oscillator and the second oscillator are controlled such that a signal level of the first detection output is equal to a signal level of the second detection output.

4. The magnetic head according to claim 1, wherein each of the first oscillator and the second oscillator is a tunneling magneto-resistive (TMR) type oscillator.

5. The magnetic head according to claim 1, wherein a difference $2\Delta f$ between the first frequency and the second frequency satisfies the following relation when a gyromagnetic ratio is denoted by $\gamma$ and a magnitude of the magnetic field applied by the auxiliary magnetic pole is denoted by Hp:

$$2\Delta f = 2\left(\frac{\gamma}{2\pi}\right)H_p.$$

* * * * *